US007945244B1

United States Patent
Delaet et al.

(10) Patent No.: US 7,945,244 B1
(45) Date of Patent: May 17, 2011

(54) METHOD AND APPARATUS FOR COMMUNICATING USING A PLURALITY OF IDENTITIES

(75) Inventors: Michael Delaet, Belton, MO (US); John McCloskey, Kensington, MD (US); Peter Agnvall, Washington, DC (US); Shane David Chapman, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 932 days.

(21) Appl. No.: 11/837,808

(22) Filed: Aug. 13, 2007

(51) Int. Cl.
*H04M 11/00* (2006.01)

(52) U.S. Cl. ..... 455/411; 455/410; 455/558; 455/414.3; 455/456.3; 705/14.1

(58) Field of Classification Search .......... 455/410–411, 455/433, 419–420, 414.1, 558, 414.3, 456.3; 705/14.1, 14.38
See application file for complete search history.

(56) References Cited

U.S. PATENT DOCUMENTS

| | | | |
|---|---|---|---|
| 6,621,895 B1* | 9/2003 | Giese | 379/201.03 |
| 7,088,989 B2 | 8/2006 | Guo | |
| 7,203,477 B2* | 4/2007 | Coppinger et al. | 455/403 |
| 7,302,254 B2* | 11/2007 | Valloppillil | 455/414.1 |
| 7,660,576 B2* | 2/2010 | Kitajima et al. | 455/412.1 |
| 7,747,282 B1* | 6/2010 | Deichmann et al. | 455/558 |
| 7,756,515 B1* | 7/2010 | Soelberg et al. | 455/420 |
| 7,865,187 B2* | 1/2011 | Ramer et al. | 455/432.3 |
| 2003/0032409 A1* | 2/2003 | Hutcheson et al. | 455/414 |
| 2004/0002348 A1* | 1/2004 | Fraccaroli | 455/456.3 |
| 2004/0192386 A1 | 9/2004 | Aerrabotu et al. | |
| 2005/0096047 A1* | 5/2005 | Haberman et al. | 455/432.3 |
| 2006/0046712 A1* | 3/2006 | Shamp et al. | 455/426.1 |
| 2006/0116105 A1 | 6/2006 | Frankel et al. | |
| 2006/0202819 A1* | 9/2006 | Adamczyk et al. | 340/539.18 |
| 2007/0021149 A1 | 1/2007 | Abbassikhah | |
| 2007/0105531 A1* | 5/2007 | Schroeder | 455/411 |
| 2010/0056114 A1* | 3/2010 | Roundtree et al. | 455/414.1 |
| 2010/0217660 A1* | 8/2010 | Biswas | 705/14.38 |
| 2010/0262487 A1* | 10/2010 | Edwards et al. | 705/14.43 |

* cited by examiner

*Primary Examiner* — Sharad Rampuria

(57) ABSTRACT

A method and apparatus for communicating using a plurality of identities is disclosed. The method includes communicating on a mobile communications device using a first identity having an associated first content and communicating using a second identity having an associated second content. The apparatus includes a processor for communicating with a communications network using the first identity having the associated first content and using the second identity having the associated second content.

18 Claims, 3 Drawing Sheets

METHOD AND APPARATUS FOR COMMUNICATING USING A PLURALITY OF IDENTITIES

FIELD OF THE INVENTION

The present invention relates generally to the field of telecommunications, and in particular to wireless communications networks.

BACKGROUND OF THE INVENTION

In this age of computing and telecommunications, most people exist in a world of multiple identities. At a minimum, there is often the simple case of dual identities: one for a personal life and another for a business/professional life.

Currently, mobile communications devices communicate utilizing a single identity that is hard-wired to the device via a physical authentication mechanism, such as a subscriber identity module (SIM) card. Thus, subscribers have a separate mobile device for each identity. For example, subscribers may have one device for communicating utilizing their work identity and another device for communicating utilizing their personal identity. Associated with these identities may be content. This presents problems.

Therefore, there is a need for an improved method and apparatus for communicating utilizing a plurality of identities.

SUMMARY OF THE INVENTION

In accordance with an embodiment of a method of the present invention, a method of communication on a mobile communications device using a plurality of identities is provided. The method includes communicating on a mobile communications device using a first identity, where a first content is associated with the first identity, and using a second identity, where a second content is associated with the second identity.

In accordance with an embodiment of an apparatus of the present invention, the apparatus includes a processor for enabling communication with a communications network using the first identity with the associated first content and using the second identity with the associated second content.

DETAILED DESCRIPTION OF THE EXEMPLARY EMBODIMENTS

Currently, identities and associated content are tied to a particular mobile communications device. The present invention provides for the identities and associated content to be decoupled from any particular mobile communications device. In accordance with the principles of the present invention, mobile communications devices may support a plurality of identities, e.g., personal, business, secret, etc., with each identity having content information associated with it.

The term "identity" as used in this application is used generically as an identification for the subscriber; it is not required to conform to any technology or standards, such as IP Multimedia Subsystem (IMS), Code Division Multiple Access (CDMA), or Global System for Mobile Communications (GSM).

Figure 1:
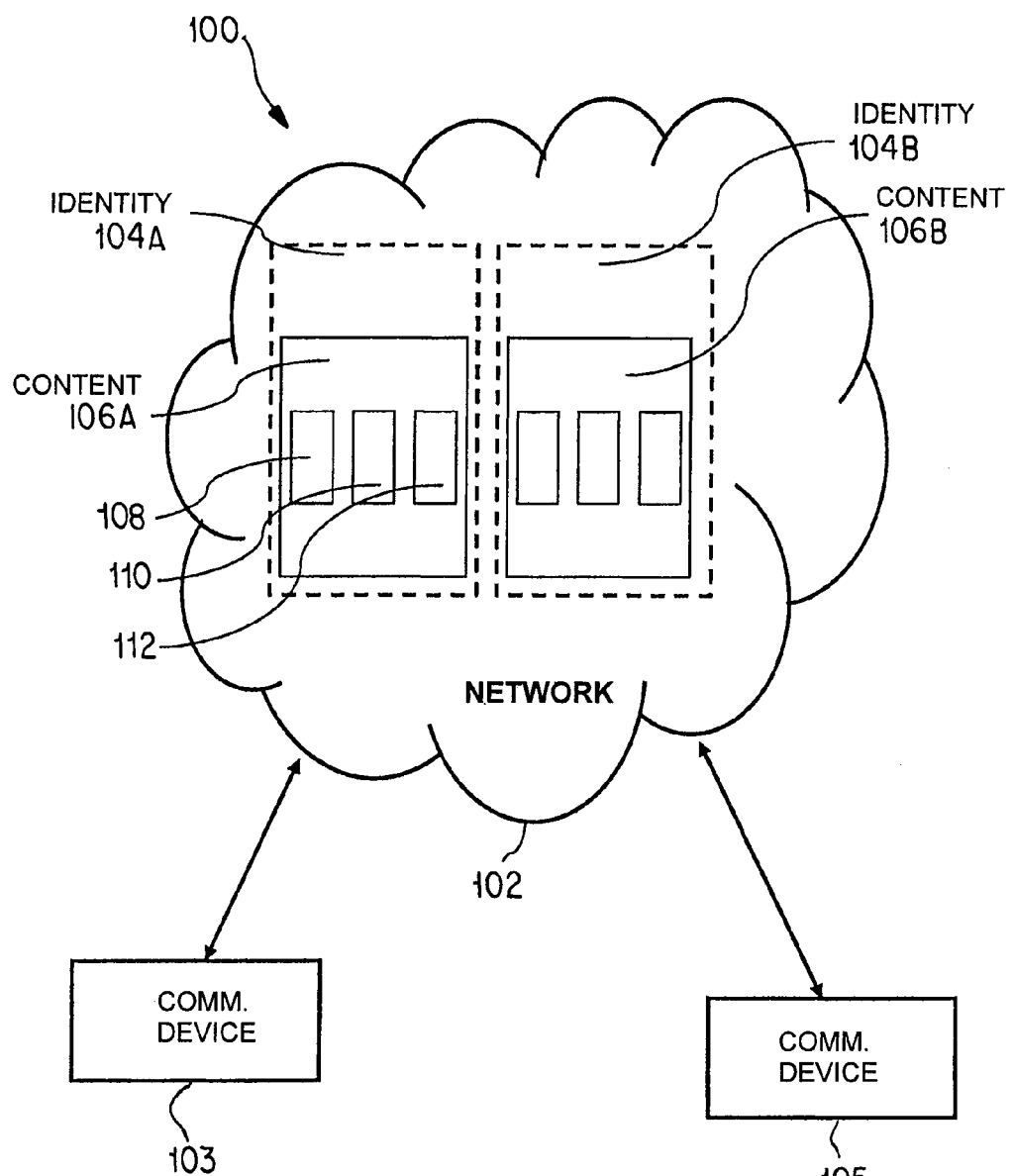
FIG. 1 illustrates a mobile communications architecture in accordance with the principles of the present invention for communicating on mobile communications devices using a plurality of identities.

FIG. 1 illustrates an embodiment of a mobile communications architecture 100 in accordance with the principles of the present invention for communicating on a mobile communications device using a plurality of identities. Mobile communications architecture 100 includes an exemplary service provider communications network 102 with mobile communications devices 103, 105 coupled to, and in communication with, network 102. Network 102 may be any wireless IP communications network known in the art, such as an Integrated Digital Enhanced Network (iDEN), a GSM network, a CDMA network, a Worldwide Interoperability for Microwave Access (WiMAX) network, or a WiFi/802.11 network. Mobile communications devices 103, 105 may be coupled to other communications networks (not shown), which in-turn interface with network 102.

Network 102 contains identities associated with a particular subscriber. As discussed above, there may be multiple identities associated with any particular subscriber. For example, one subscriber may simply have a personal identity and a business identity. Another subscriber may additionally create a secret, anonymous identity. Any type of identity imaginable may be created by a subscriber in order to help compartmentalize any services associated with an identity, e.g., for billing purposes, organization purposes, privacy purposes, etc. Identities may be created, deleted, or modified by a subscriber at any time.

In the illustrated embodiment, network 102 contains at least two identities related to a subscriber, i.e., a personal identity 104A and a business identity 104B. Identities 104A and 104B may be stored within network 102 and/or stored external to network 102. In an embodiment, identities 104A and 104B may be stored in a central database, e.g., on a server, that is coupled to network 102. The present invention is not limited to any particular device or method for storing identities 104A and 104B on network 102. Identities associated with a single subscriber may be correlated to each other and stored based on that correlation on network 102. In an embodiment, personal identity 104A and business identity 104B are stored together. In another embodiment, personal identity 104A and business identity 104B are stored separately but are linked to each other.

Personal identity 104A and business identity 104B each have content associated with them that may be unique and customizable by the subscriber. In the illustrated embodiment, content 106A is associated with personal identity 104A and content 106B is associated with business identity 104B. Content 106A and 106B, for example, includes data, information, and/or services associated with the respective identity. Content 106A and 106B may include, but is not limited to, identifiers, services, applications, and preferences.

In one embodiment, content 106A and 106B includes identifiers, or contact information, associated with the respective identity, e.g., phone number, e-mail address, IM handle, etc. The content may also include databases of information associated with the respective identity, e.g., contacts, calendar items, task lists, and call logs. Further, the content may include applications associated with the respective identity, e.g., games, web browsers, IM applications, billing applications, and tools. Additionally, the content may include custom preferences associated with the respective identity, e.g., ring tones, themes, settings, browser bookmarks, and alarms.

Furthermore, the content may vary based on the type of identity. For example, in the illustrated embodiment, content 106A includes a gaming application 108, a database 110, e.g., a music playlist, and a custom preference 112, e.g., wallpaper, associated with personal identity 104A. Content 106B of business identity 104B, however, most likely will not include gaming applications, music playlists, and the like. Instead, content 106B may include, for example, task lists, a calendar of appointments, and business contacts associated with business identity 104B.

As discussed above, mobile communications devices 103, 105 are coupled to, and in communication with, network 102. Mobile communications devices 103, 105 may be any IP-enabled mobile communications device including, but not limited to, mobile cellular telephones, Personal Digital Assistants (PDAs), Pocket PCs, laptop computers, desktop computers, and consumer electronic devices with IP connectivity, e.g., gaming devices and music players. The present invention is not limited to any particular type of communications device and may be embodied as any device, such as communications devices in automobiles, IP "pay phones" or kiosks, laptops embedded with 4G wireless technology, and cable set-top boxes.

As will be further described, a subscriber may pick up any mobile communications device, e.g., device 103, with IP connectivity and access any of his or her identities, e.g., identity 104A, by entering authentication credentials, such as a login and password, associated with the identities. The subscriber has the option of signing into multiple identities at once, or just the one needed on that particular device. Upon submitting the authentication credentials to the network, e.g., network 102, in an embodiment, a copy of the content associated with each of the selected identities is sent to the mobile device. The subscriber may then use the full suite of content associated with the identity or identities selected on the mobile communications device. While the subscriber is using the mobile device, all content that is modified or added is synchronized with the network copy. Furthermore, once the subscriber shuts down the mobile device, all modified content is updated on the network copy. This centralized storage of content in the network allows subscribers to decouple their wireless services from a particular mobile device. Thus, in accordance with the principles of the present invention, a subscriber is able to communicate by utilizing multiple identities on a single communications device, and all content associated with the multiple identities is also available to the subscriber on the single communications device. The identities and associated content can also be utilized for communication on a different mobile communications device.

Figure 2:
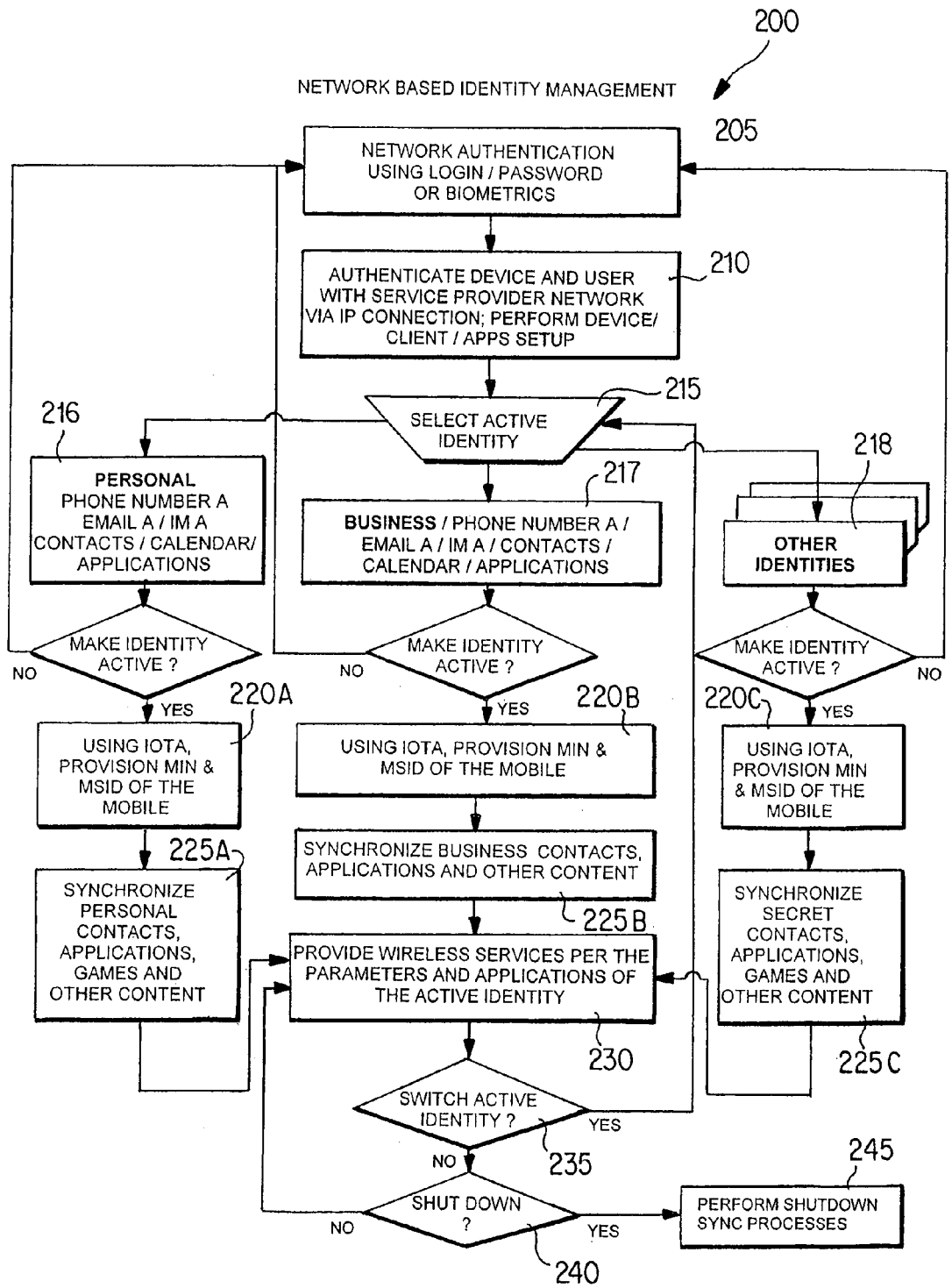
FIG. 2 illustrates a method in accordance with an embodiment of the present invention.

FIG. 2 illustrates a method 200 for communicating on a mobile communications device using a plurality of identities in accordance with an embodiment of the invention. In this embodiment, method 200 is performed using an IP Multimedia Subsystem (IMS) infrastructure. Method 200 is initiated with step 205, wherein a subscriber authenticates with a communications network by submitting authentication credentials to the communications network via an IP connection. The authentication credentials are associated with the subscriber's identities stored on the communications network. In an embodiment, authentication is accomplished by the subscriber entering a user login and password associated with one or more identities of the subscriber, e.g., personal, business, secret, into the mobile communications device. There may be separate authentication credentials for each identity or a single set of authentication credentials for all of the identities associated with the subscriber. In another embodiment, authentication is accomplished via a biometric scanner, e.g., fingerprint or retina, on the mobile communications device. Thus, the embodiment of method 200 utilizes a network-based identity management process.

At step 210, the network authenticates the communications device and user via an IP connection. The network also performs a setup operation based on the authentication credentials submitted to the communications network. This setup may include initialization and configuration of a processor residing within the mobile communications device. The setup may further include locating the content residing on the communications network that is associated with the authenticated identities, making a copy of the content, and configuring the synchronization interface between the network and the mobile communications device. The setup generally correlates the mobile communications device, the subscriber, the identity(s), and the associated content.

At step 215, the subscriber selects the identities he or she wishes to be active. Selection of the active identities may be accomplished in any of a variety of ways, and the present invention is not limited to any particular method. In an embodiment, selection of the active identities is accomplished by a manual user selection, such as scrolling between the identities and selecting the identities to be made active or by clicking on the identities on a touch-screen. In another embodiment, selection of the active identities may be event-driven. Triggering events may include day of the week, time of day, location, and the like.

In an embodiment, the subscriber may choose from a personal identity 216, a business identity 217, and various other identities 218 associated with the authentication credentials provided. As discussed previously and as shown in FIG. 2, each type of identity may have different content associated with it. For example, the content of personal identity 216 may include a personal phone number, a personal e-mail address, a personal IM handle, a database of personal contacts, a personal calendar, and applications, e.g., games, music playlists, etc. The content of business identity 217 may include a business phone number, a business e-mail address, a business IM handle, a database of business contacts, and applications, e.g., a task list, billing timers, etc. Finally, the content of other identities 218 may similarly include phone numbers, e-mail addresses, IM handles, contacts, calendars, themes, and other applications and preferences.

The subscriber has the option of activating multiple identities at the same time or activating a single identity. Because of the centralized storage of the identities on the network, a subscriber may activate a first identity on a first mobile communications device and simultaneously activate a second identity on a second mobile communications device.

If a selected identity is to be made active, method 200 continues to respective steps 220A, 220B, and/or 220C, where the mobile communications device is provisioned with a Mobile Identification Number (MIN) and a Mobile Subscriber Identification (MSID) using Internet Over-the-Air (IOTA). In an embodiment, the MIN and MSID will be pushed to the mobile communications device via an IOTA server. The MIN is a phone number and the MSID is a network identifier associated with the respective identity. If multiple identities are selected, separate MINs and MSIDs will be provisioned for each respective identity.

At respective steps 225A, 225B, and 225C, the content associated with each selected identity is synchronized to the mobile communications device from the communications network. In an embodiment, if a subscriber activates multiple identities, the content associated with those identities will be merged. In another embodiment, the content associated with the respective active identities will remain segregated on the communications device. The content may be cached locally on the mobile communications device so that it can be accessed by the processor. The caching may be accomplished by any technique known to one of ordinary skill in the art, e.g., static RAM. The content may be either transferred to the mobile communications device by the network, a copy of the content may be provided from the network, or the mobile communications device may access the content from the network, and thus, not locally store the content. The present invention is not limited to how the content associated with an identity is utilized by the mobile communications device.

At step 230, the mobile communications device provides interoperability with the content associated with a selected identity. For example, wireless services associated with each active identity may be provided per the parameters and applications of the active identity(s). The wireless services supported are not limited to voice communications, but rather, can include a variety of different types of services, including communications services. The wireless services supported include, but are not limited to, dispatch calling services, e.g., Push-To-Talk (PTT) services, interconnect calling services, e.g., regular mobile phone calls and voicemail, and data services, e.g., e-mail services, Instant Message (IM) services, text messaging services (SMS), multimedia messaging services (MMS), gaming applications, etc.

When operating a mobile communications device with multiple active identities, wireless services associated with each identity may be performed simultaneously. For inbound calls, each identity may have a unique ring tone associated with it. A display message may also appear that informs the subscriber which identity the caller is associated with. If the subscriber is not signed into the identity with which the caller is associated with, then the call may be routed per the subscriber's definition, e.g., directly to voicemail or give the subscriber a pop-up notice with an option to switch to that call. For outbound calls, either the subscriber would specify which contacts are associated with each particular identity or they would select the identity to use when making the outbound call.

The content associated with the active identities may be created, deleted, and modified by the subscriber at any time during use. In an embodiment, any content that is added, deleted, or modified in any way when used at the communications device is synchronized with the content on the network.

Decision block 235 determines whether a subscriber wants to switch the identity or identities that are currently active. If decision block 235 determines that the subscriber wants to switch active identities, then step 215 is initiated.

Decision block 240 determines whether a subscriber wants to shut down the mobile communications device. If decision block 240 detects a shut-down request, step 245 is initiated, where, in an embodiment, the mobile communications device performs a shut-down synchronization process with the network.

In an embodiment, during the shut-down process, all content is synchronized from the local cache on the mobile communications device back to the communications network. The network content is thus updated and stored for future use. Thus, the next time the subscriber authenticates with the communications network, whether on the same mobile communications device or on a different mobile communications device, the updated content on the communications network will be available for use.

As discussed above, steps 220A, 220B, and 220C, and 225A, 225B, and 225C, may be simultaneously performed in parallel for each identity that the subscriber selects to be active on the mobile communications device. Thus, in an embodiment, communications with the communications network regarding each respective identity may have an identifier associated with it so that the network recognizes which identity the communication pertains to.

Figure 3:
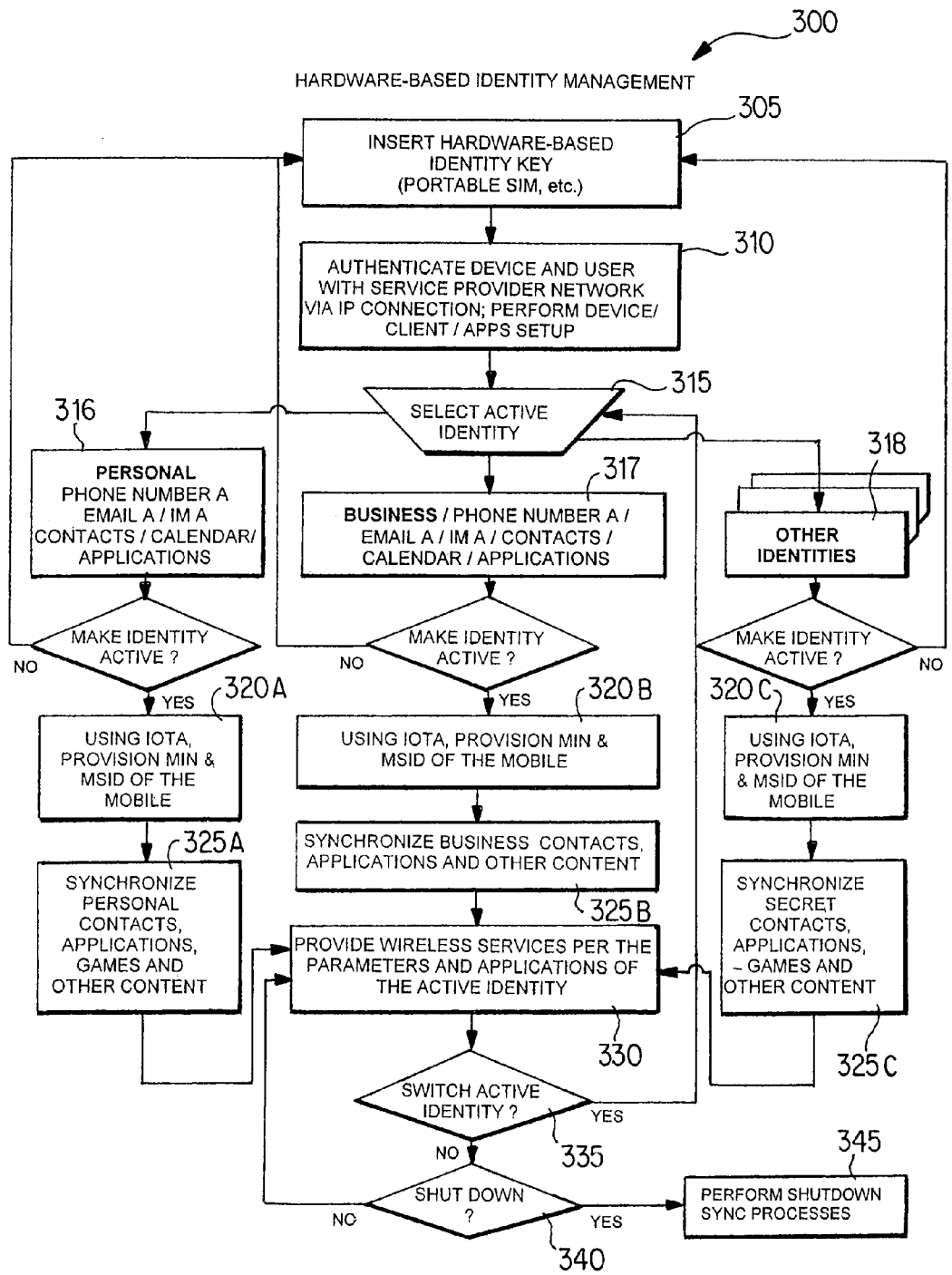
FIG. 3 illustrates a method in accordance with an alternative embodiment of the present invention.

FIG. 3 illustrates an alternative method 300 for communicating on a mobile communications device using a plurality of identities in accordance with the principles of the present invention. The method of FIG. 3 is similar to the method of FIG. 2 with the exception that method 300 provides a hardware-based identity management process, whereas method 200 provides network-based identity management. At step 305, a subscriber inserts a hardware-based identity key, e.g., a portable SIM card, into a mobile communications device. The identity key may include authentication credentials associated with the subscriber's identities. These authentication credentials are communicated to the communications network, where authentication of the device and the subscriber is initiated. Steps 310 through 345, which correspond to steps 210 through 245 of method 200, are then performed in a manner similar to that described above in conjunction with FIG. 2.

Method 200 and method 300 may be performed on any IP-enabled device. Consequently, identities and their associated content are not hard-wired to any particular mobile communications device, but are portable and accessible from any mobile communications device with IP connectivity. Thus, subscribers are only tied to their identities and not to any particular mobile communications device. In addition, because any IP-enabled device can be used, subscribers may access their wireless services from devices communicating with any IP network, not just the network owned and operated by the service provider to which they subscribe. Furthermore, subscribers can separate usage by identity or groups of identities, e.g., for individual-liable and corporate-liable billing. Finally, centralizing storage of content in the network, and not on the physical devices, prevents data loss and allows subscribers to communicate with a plurality of identities on a single mobile communications device. These aspects of the invention provide mobile communications using a plurality of identities that is flexible and convenient for subscribers.

The disclosed embodiments are illustrative of the various ways in which the present invention may be practiced. Various other modifications, changes and embodiments can be implemented by those skilled in the art without departing from the spirit and scope of the present invention. Therefore, the scope of the invention should be determined by the appended claims and their legal equivalents.

What is claimed is:

1. A method of communication, comprising:
 establishing, by a mobile communication device, a communication session with a mobile communication system;
 selecting, by the mobile communication device, a first identity, wherein a first content associated with the first identity is stored at a first database accessible through the mobile communication system and the first content is independent of the mobile communication device;
 requesting, by the mobile communication device to the mobile communication system, activation of the first identity, wherein the request comprises first authentication credentials associated with the first identity and the first authentication credentials are independent of an authentication of the communication session;

receiving, at the mobile communication device, the first content, and configuring the mobile communication device according to the first identity, if the first identity is authenticated;

selecting, by the mobile communication device, a second identity, wherein a second content associated with the second identity is stored at a second database accessible through the mobile communication system and the second content is independent of the mobile communication device;

requesting, by the mobile communication device to the mobile communication system, activation of the second identity, wherein the request comprises second authentication credentials associated with the second identity and the second authentication credentials are independent of the authentication of the communication session; and receiving, at the mobile communication device, the second content, and configuring the mobile communication device according to the second identity, if the second identity is authenticated.

2. The method according to claim 1, wherein the first content includes contact information associated with the first identity and the second content includes contact information associated with the second identity.

3. The method according to claim 1, wherein the first content includes a first gaming application and the second content includes a second gaming application.

4. The method according to claim 1, wherein the first content includes a first custom preference associated with the first identity and the second content includes a second custom preference associated with the second identity.

5. The method according to claim 1, wherein the authentication credentials associated with the first identity comprise a first username and a first password and the authentication credentials associated with the second identity comprise a second username and a second password.

6. The method according to claim 5, wherein the authentication credentials associated with the first and second identities are contained on a hardware-based identity key inserted into the mobile communications device.

7. The method according to claim 1, further comprising: receiving, at the mobile communication device, first and second phone numbers and first and second network identifiers from a communications network via an Internet Over-the-Air (IOTA) interface, wherein the first and second phone numbers and the first and second network identifiers are associated with the first and second identities, respectively.

8. The method according to claim 1, further comprising the step of caching at least one of the first content and the second content on the mobile communications device.

9. The method according to claim 1, further comprising synchronizing at least one of the first content and the second content between the mobile communications device and at least one of the first database and the second database through the mobile communication system.

10. The method according to claim 9, wherein synchronizing includes the step of updating the at least one of the first content and the second content based on modifications made to at least one of the first content and the second content at the mobile communications device.

11. The method according to claim 10, further comprising receiving, at the mobile communication device, a copy of the updated at least one of the first content and the second content from the communications network.

12. A mobile communications device, comprising:
a processor configured to request a mobile communications system activation and authentication of at least one of a first identity and a second identity out of a plurality of identities, to receive content associated with the at least one of the first identity and the second identity from a database accessible through the mobile communication system, and to control the mobile communications device to communicate with the mobile communications system using the at least one of the first identity and the second identity if the mobile communication system authenticates the at least one of a first identity and a second identity;

a transceiver, coupled to the processor, configured to establish and maintain a communication session with the mobile communications system; and a user interface for selecting the at least one of the first identity and the second identity, wherein the request comprises authentication credentials associated with the at least one of the first identity and the second identity.

13. The mobile communications device according to claim 12, wherein the mobile communications device is an IP-enabled device.

14. The mobile communications device according to claim 12, further comprising a storage unit coupled to the processor, wherein a copy of the content associated with the at least one of the first identity and the second identity is cached on the storage unit.

15. The mobile communications device according to claim 12, wherein the mobile communications device provides wireless services associated with the content associated with the at least one of the first identity and the second identity.

16. The mobile communications device according to claim 12, wherein the mobile communications device transmits an update to the content associated with the at least one of the first identity and the second identity to the communications network, and wherein a network copy of the content associated with the at least one of the first identity and the second identity is updated based on the update.

17. The mobile communications device according to claim 16, wherein the mobile communications device receives a copy of the updated network copy of the updated network copy of the content associated with the at least one of the first identity and the second identity from the communications network.

18. The method of claim 1, further comprising
synchronizing at least one of the first content and the second content between the mobile communications device and at least one of the first database and the second database through the mobile communication system;

disestablishing, by the mobile communication device, the communication session with the mobile communication system;

establishing, by a second mobile communication device, a second communication session with the mobile communication system;

selecting, by the second mobile communication device, the first identity;

requesting, by the second mobile communication device to the mobile communication system, activation of the first identity, wherein the request comprises the first authentication credentials;

receiving, at the second mobile communication device, the first content, and configuring the mobile communication device according to the first identity, if the first identity is authenticated.

* * * * *